United States Patent [19]

Terae et al.

[11] Patent Number: 5,244,599
[45] Date of Patent: Sep. 14, 1993

[54] DEFOAMER COMPOSITIONS

[75] Inventors: Nobuyuki Terae; Tadashi Domae, both of Annaka, Japan

[73] Assignee: Shin-Etsu Chemical Co., Ltd., Tokyo, Japan

[21] Appl. No.: 614,425

[22] Filed: Nov. 16, 1990

[30] Foreign Application Priority Data

Nov. 16, 1989 [JP] Japan .................................. 1-298147

[51] Int. Cl.$^5$ ........................ B01D 19/04; C09K 3/00
[52] U.S. Cl. ..................................... 252/358; 252/321
[58] Field of Search ................................ 252/321, 358

[56] References Cited

U.S. PATENT DOCUMENTS

| | | | |
|---|---|---|---|
| 3,233,986 | 2/1966 | Morehouse | 252/358 X |
| 4,076,648 | 2/1978 | Rosen | 252/358 |
| 4,395,352 | 7/1983 | Kulkarni et al. | 252/321 |
| 4,514,319 | 4/1985 | Kulkarni et al. | 252/321 |
| 4,597,894 | 7/1986 | Abe et al. | 252/358 |
| 4,690,713 | 9/1987 | Terae et al. | 252/358 X |
| 4,912,157 | 3/1990 | Clark et al. | 524/265 |
| 5,004,559 | 4/1991 | Koerner et al. | 252/358 X |

FOREIGN PATENT DOCUMENTS

56-129013 10/1981 Japan .
60-173068 9/1985 Japan .

OTHER PUBLICATIONS

Derwent Abstract, AN 81-86118D/47 (corresponding to J56-129013).
Patent Abstracts of Japan, JP 60-173068, vol. 10, No. 17, C-324, pp. 142 C 324.
Patent Abstracts of Japan, JP 57-180470, vol. 7, No. 22, pp. 113 C 148.
Patent Abstracts of Japan, JP 56-139107, vol. 6, No. 15, pp. 54 C 89.
Patent Abstracts of Japan, JP 55-161850, vol. 5, No. 35, pp. 120 C 46.
Patent Abstracts of Japan, JP 53-34853, vol. 2, No. 76.

*Primary Examiner*—Robert L. Stoll
*Assistant Examiner*—Daniel S. Metzmaier
*Attorney, Agent, or Firm*—Millen, White, Zelano & Branigan

[57] ABSTRACT

A defoamer composition comprising (A) an organopolysiloxane containing an oxyalkylene group having an appropriate hydrophilic-hydrophobic balance, (B) another organopolysiloxane containing an oxyalkylene group serving as a surface active agent for component (C), (C) a dimethylpolysiloxane for retaining defoaming power, and (D) a silica filler can maintain defoaming power for a long time, for example, when it is added to a developer for exposed photosensitive resin which is subject to shearing stresses in the wash-out step.

8 Claims, No Drawings

DEFOAMER COMPOSITIONS

This invention relates to defoamer compositions, and more particularly, defoamer compositions which can maintain their defoaming ability for a prolonged period of time when used under severe conditions where high shearing forces are applied for a long time, as in the step of washing out a photosensitive resin after exposure.

BACKGROUND OF THE INVENTION

The recent trend in printing form plates for newspaper, magazines and the like is to replace conventional lead form plates by photosensitive resin form plates which can be quickly processed in a simple manner and eliminate the risk of contamination with toxic substances as typified by heavy metals. The photosensitive resin form plates are produced by processing liquid and solid photosensitive resins which undergo a chemical change upon exposure to ultraviolet light or the like, wherein the liquid photosensitive resin in exposed areas cures and conversely, the solid photosensitive resin in exposed areas decomposes into liquid. This process includes a wash-out step in which photosensitive resin plates after exposure are set in a wash-out apparatus where the uncured portions or the portions liquefied by decomposition are washed out by injecting a developer for the photosensitive resin by means of a pump or the like.

The developers used in the wash-out step are required to have intense washing action and are generally aqueous solutions containing an inorganic alkali salt such as sodium borate and a surface active agent. Therefore, the developers tend to foam due to injection by a pump in the wash-out step, which results in bubbles emerging out of the apparatus or induces cavitation in the pump to reduce its injection pressure, both interfering with processing and reducing operation efficiency. It is thus a common practice for such a step to previously add defoamers to the developers to prevent foaming.

Among these defoamers, emulsion type defoamers having an oil compound consisting of dimethylpolysiloxane and silica fine powder dispersed in water with a surface active agent are widely used. These defoamers, however, have a drawback that emulsion is broken and in some cases, they rather promote foaming when a solution to which the defoamer is added contains an inorganic alkali salt and/or when high shearing forces are applied for a prolonged period of time as by injection through a pump. As a result of emulsion breakage, the oil compound will agglomerate and form a scum which will adhere to the apparatus and form plates. The water-repellent dimethylpolysiloxane can impart repellency to the form plates, detracting from the quality thereof.

One solution to this problem is to use an organopolysiloxane modified with a polyoxyalkylene group as disclosed in U.S. Pat. No. 3,233,986, Japanese Patent Publication No. 58126/1983, and Japanese Patent Application Kokai No. 180407/1982. This defoamer, however, undesirably has a low defoaming power. Attempts have been made to increase defoaming power by using such an organopolysiloxane modified with a polyoxyalkylene group along with an oil compound consisting of a diorganopolysiloxane, typically dimethylpolysiloxane and silica fine powder as disclosed in Japanese Patent Application Kokai No. 34854/1978, 161850/1980, 129013/1981, and 189933/1984, and Japanese Patent Publication No. 34847/1986, 23084/1980, 22638/1977, and 30872/1989.

However, some problems arise if a developer for photosensitive resin having such a defoamer added thereto is used in practice. If a larger amount of the oil compound component consisting of a diorganopolysiloxane and silica fine powder is blended in the composition in order to retain defoaming ability over a prolonged period of time, then the hydrophobic oil compound component undergoes agglomeration in the wash-out step where mechanically intense shearing forces are applied for a long period of time, adhering to the apparatus and form plates which are contaminated and rendered repellent. In turn, if the amount of the oil compound component is reduced, it is difficult to retain defoaming ability over a prolonged period of time.

An object of the present invention is to eliminate the above-mentioned problems. Another object is to provide a defoamer composition which can retain defoaming ability over a prolonged period of time. A further object is to provide a defoamer composition which, when added to solutions to be used under severe conditions where high shearing forces are applied for a long time as in the wash-out step for a photosensitive resin after exposure, can maintain minimal foamability, has high enough mechanical stability to prevent agglomeration, and thus eliminates any interference to or contamination of the associated apparatus and form plates.

SUMMARY OF THE INVENTION

The inventors have found that there is obtained a defoamer composition which has improved defoaming ability and retains the ability for a prolonged period of time, by using an oxyalkylene group-containing organopolysiloxane of the following formula (1) together with an oxyalkylene group-containing organopolysiloxane of the following formula (2) and blending them with a dimethylpolysiloxane and a silica filler. A developer for photosensitive resin to which the defoamer composition is added can retain minimal foamability and mechanical stability and give rise to no agglomeration under high shearing, severe conditions of the wash-out step, eliminating any trouble like contamination of the associated apparatus and form plates.

According to the present invention, there is provided a defoamer composition comprising (A) 5 to 50 parts by weight of an organopolysiloxane containing an oxyalkylene group having formula (1):

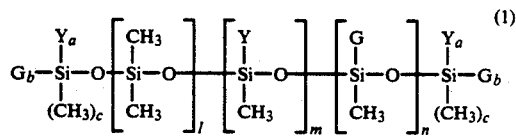

wherein Y is a monovalent hydrocarbon group having 6 to 30 carbon atoms or an alkoxy group having 6 to 30 carbon atoms, G is an oxyalkylene group of the formula:

wherein R is a divalent hydrocarbon group having 2 to 6 carbon atoms, A is a group selected from the class consisting of a hydrogen atom, an acetyl group, an alkyl group having 1 to 8 carbon atoms, and an isocyanate group, d=6 to 60, e=2 to 60, d+e=8 to 75, and e/(d+e)=0.2 to 0.8, said oxyalkylene group having an average molecular weight of 500 to 5,000, a and b are independently equal to 0, 1 or 2,
c is equal to 1, 2 or 3,
a+b+c=3,
l is an integer of from 10 to 200,
m is a number such that m+2a is equal to 1 to 50,
n is a number such that n+2b is equal to 1 to 30, and (n+2b)/l=0.01 to 1, (B) 100 parts by weight of an organopolysiloxane containing an oxyalkylene group having formula (2):

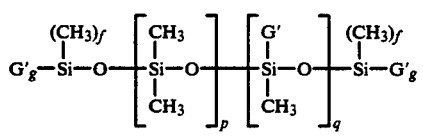

wherein G' is an oxyalkylene group of the formula:

—R—O—(C$_2$H$_4$O)$_h$(C$_3$H$_6$O)$_i$—A wherein R and A are as defined above, h=6 to 60, i=2 to 60, h+i=8 to 75, and i/(h+i)=0.2 to 0.8, said oxyalkylene group having an average molecular weight of 500 to 5,000, f is equal to 1, 2 or 3,
g is equal to 0, 1 or 2,
f+g=3,
p and q are independently integers of at least 1, and (q+2g)/p=0.02 to 1, (C) 20 to 200 parts by weight of a dimethylpolysiloxane having a viscosity of 100 to 1,000,000 centistokes at 25° C., and (D) a silica filler.

DETAILED DESCRIPTION OF THE INVENTION

The defoamer composition of the invention contains components (A), (B), (C), and (D), which will be described in detail.

Component (A) is an organopolysiloxane containing an oxyalkylene group having formula (1).

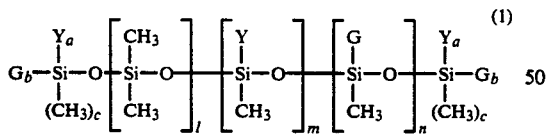

In formula (1), Y is a monovalent hydrocarbon group having 6 to 30 carbon atoms, preferably 8 to 20 carbon atoms or an alkoxy group having 6 to 30 carbon atoms. Examples of the former include alkyl groups such as hexyl, octyl, decyl, dodecyl, tetradecyl, and octadecyl groups, and aralkyl groups such as α-methylstyryl, 2-phenylethyl, and 2-phenyloctyl groups. The alkoxy group is preferably represented by —OR' wherein R' is an alkyl group having 6 to 30 carbon atoms.

G is an oxyalkylene group of the formula:

—R—O—(C$_2$H$_4$O)$_d$(C$_3$H$_6$O)$_e$—A wherein R is a divalent hydrocarbon group having 2 to 6 carbon atoms, for example, alkylene groups such as ethylene, propylene, and butylene groups and arylene groups such as a phenylene group; and A is a group selected from the class consisting of a hydrogen atom, an acetyl group, an isocyanate group, and an alkyl group having 1 to 8 carbon atoms, for example, methyl, ethyl, propyl, butyl and hexyl groups.

Letters d and e are selected so as to provide a balance between hydrophilic and hydrophobic aspects of the oxyalkylene group, more particularly d=6 to 60, e=2 to 60, d+e=8 to 75, and e/(d+e)=0.2 to 0.8; preferably, d=10 to 30, e=4 to 30, and d+e=15 to 60. The oxyalkylene group has an average molecular weight of 500 to 5,000, preferably 800 to 3,000. The oxyalkylene group becomes less effective as a hydrophilic group with an average molecular weight of less than 500 whereas an average molecular weight in excess of 5,000 provides a too high viscosity, leading to poor dispersion.

In formula (1), letters a and b are independently equal to 0, 1 or 2, c is equal to 1, 2 or 3, and a+b+c=3. Letter l is an integer of from 10 to 200, m is a number such that m+2a is equal to 1 to 50, preferably 2 to 30, n is a number such that n+2b is equal to 1 to 30, preferably 2 to 20, and (n+2b)/l=0.01 to 1, preferably 0.05 to 0.4. The composition loses defoaming ability with l of less than 10, whereas l of more than 200 increases the hydrophobic moiety, detracting from dispersibility. If (m+2a) is less than 1, the defoamer composition in diluted form is less dispersion stable. A (m+2a) value in excess of 50 is detrimental to defoaming ability. Letter n is selected such that (n+2b) is equal to 1 to 30 and (n+2b)/l=0.01 to 1 because the group represented by G is a group capable of imparting hydrophilic nature to the organopolysiloxane of formula (1).

Several illustrative, non-limiting examples of the organopolysiloxane containing an oxyalkylene group of formula (1) are given below.

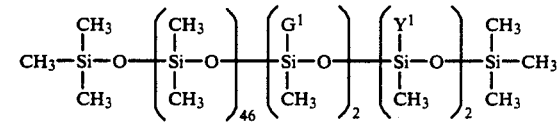

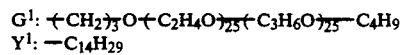

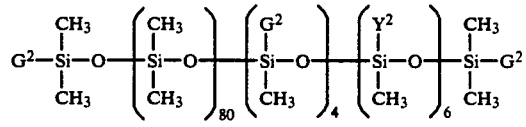

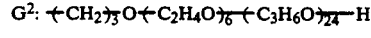
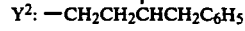

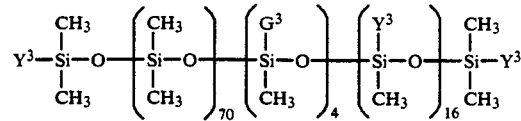

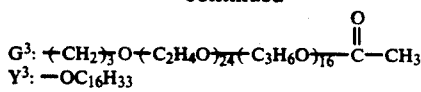

$G^3$: $-(CH_2)_3O-(C_2H_4O)_{24}-(C_3H_6O)_{16}-\overset{\overset{O}{\|}}{C}-CH_3$ $Y^3$: $-OC_{16}H_{33}$ The organopolysiloxane containing an oxyalkylene group of formula (1) may be synthesized by a prior art, well-known method. For example, it is synthesized by effecting addition reaction of a polyoxyalkylene compound having a vinyl or allyl group at the end of its molecular chain and an unsaturated olefin having 6 to 30 carbon atoms or an alkyl substituted styrene to an organopolysiloxane having a ≡SiH group in the presence of a platinum catalyst, or by effecting dehydrogenation addition reaction of an alcohol having 6 to 30 carbon atoms to the ≡SiH group of the organopolysiloxane in the presence of a zinc powder catalyst.

Component (B) is an organopolysiloxane containing an oxyalkylene group having formula (2), which acts as a surface active agent for assisting in dispersing component (C) or dimethylpolysiloxane to be described later in water.

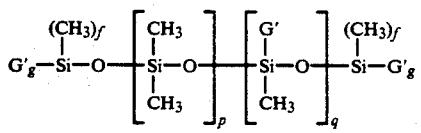

In formula (2), G' is an oxyalkylene group of the formula:

wherein R and A are as defined above. Letters h and i are h=6 to 60, preferably 10 to 30, i=2 to 60, preferably 4 to 30, and h+i=8 to 75, preferably 15 to 60. In order to provide a balance between hydrophilic and hydrophobic aspects and allow for emulsification and dispersion of component (C) or dimethylpolysiloxane, letter h and i are further selected to be i/(h+i)=0.2 to 0.8. With a i/(h=i) value of less than 0.2, the function as a surface active agent is lost due to enhanced hydrophobic nature and a too low HLB value, whereas with a i/(h+i) value of more than 0.8, the function as a surface active agent is lost due to enhanced hydrophilic nature and a too high HLB value. The oxyalkylene group represented by G' has an average molecular weight of 500 to 5,000, preferably 800 to 3,000. Below 500, the compound is a less effective surface active agent whereas an average molecular weight in excess of 5,000 provides a too high viscosity, leading to poor dispersion.

In formula (2), letter f is equal to 1, 2 or 3, g is equal to 0, 1 or 2, f+g=3, p and q are independently integers of at least 1, and (q+2g)/p=0.02 to 1, preferably 0.03 to 0.4. With (q+2g)/p<0.02, the compound becomes more hydrophobic, leading to a loss of surface activity, whereas defoaming ability is lost with (q+2g)/p>1. The value of p+q is not particularly limited although it is preferably selected from surface active and working considerations such that the organopolysiloxane of formula (2) has a viscosity of 100 to 8,000 centistokes at 25° C.

Several illustrative, non-limiting examples of the organopolysiloxane containing an oxyalkylene group of formula (2) are given below.

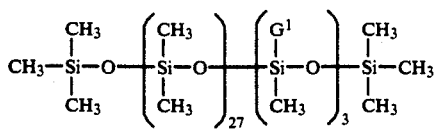

$G^1$: $-(CH_2)_3O-(C_2H_4O)_{25}-(C_2H_4O)_{25}-C_4H_9$

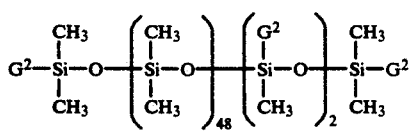

$G^2$: $-(CH_2)_3O-(C_2H_4O)_{16}-(C_3H_6O)_{24}-H$

Also, the organopolysiloxane containing an oxyalkylene group of formula (2) may be synthesized by a prior art, well-known method as previously described for formula (1).

These two types of organopolysiloxane containing an oxyalkylene group, that is, components (A) and (B) are blended such that 5 to 50 parts by weight, preferably 10 to 30 parts by weight of component (A) is present per 100 parts by weight of component (B). Less than 5 parts of component (A) is ineffective in stabilizing dispersion whereas more than 50 parts of component (A) inhibits the surface activity of component (B).

Component (C) is a dimethylpolysiloxane which is a major component for imparting prolonged defoaming ability to the defoamer composition. The dimethylpolysiloxane used herein may be either linear or branched, but is preferably end blocked with a trimethylsilyl, monohydroxydimethylsilyl or similar group. As to the viscosity of the dimethylpolysiloxane, a lower viscosity is preferred for ease of dispersion and prevention of repellency, whereas a higher viscosity is desired for retaining defoaming ability. As a compromise, the dimethylpolysiloxane has a viscosity of 100 to 1,000,000 centistokes (cs) at 25° C. A viscosity of at least 500 cs is preferred for compatibility with component (A) or organopolysiloxane containing an oxyalkylene group and for affinity with any organic substance in the dispersion medium, whereas a viscosity of up to 300,000 cs is preferred for dispersion.

Component (C) is blended with component (B) such that 20 to 200 parts by weight of component (C) is present per 100 parts by weight of component (B). Defoaming ability is lost if the proportion of component (C) relative to component (B) is too low, whereas hydrophobic nature is enhanced to detract from dispersibility and stability if the same proportion is too high. The presence of 50 to 100 parts by weight of component (C) per 100 parts by weight of component (B) is preferred for dispersion and defoaming aspects.

Component (D) in the present composition is a silica filler. The silica filler may be selected from well-known ones including wet and dry silicas. Examples include precipitated silica, silica xerogel, fumed silica, and these silicas which are surface treated with an organic silyl group. They are commercially available, for example, as Aerogel (tradename, by Nihon Aerogel K.K.), Nipsil (tradename, by Nihon Silica K.K.), Cab-O-Sil (trademark, by Cabot Corp.) and Santocel (trademark, by Monsanto Industrial Chemicals Co.). The silica filler preferably has a specific surface area of 50 to 500 m²/g as measured by BET.

More or less amounts of component (D) will fail to provide appropriate defoaming ability and too much amounts will result in a thick system which is difficult to handle. Therefore, it is preferred that 0.1 to 30 parts, especially 1 to 20 parts by weight of component (D) is present per 100 parts by weight of component (B).

The defoamer composition of the invention is obtained by mixing predetermined amounts of components (A) to (D) in a mixer such as a homomixer until the mixture becomes uniform. The order of blending the components is not particularly limited. As the case may be, heating to temperatures of 40° to 150° C. is acceptable during mixing.

The defoamer composition of the invention not only minimizes the foaming ability of a solution to which it is added, but is mechanically stable and invites no agglomeration under high shearing stresses. It is thus effective for use in developers for photosensitive resins, high temperature dye solutions, general coating compositions, metal machining oil cleaning compositions and other solutions.

The developers for photosensitive resins to which the defoamer composition of the invention is applicable are developers which are used for curing those areas of a liquid photosensitive resin layer which have been exposed to ultraviolet light or decomposing and liquefying similar exposed areas of a solid photosensitive resin layer and thereafter, washing out any liquid portions. These developers are generally solutions having surface active agents blended in water or alkaline aqueous solutions. Examples of the alkali used in the developer include sodium borate, sodium carbonate, sodium phosphate, and sodium hydrogen carbonate. Examples of the surface active agent include anionic ones such as polyoxyethylene alkylphenyl ether sulfates and sodium polyoxyethylene ether carboxylates; cationic ones such as alkyltrimethylammonium chlorides and alkyldimethylbenzylammonium chlorides; and nonionic ones such as polyoxyethylene alkylphenyl ethers and polyoxyethylene high alcohol ethers. The defoamer composition of the invention is applicable to any of these developers for photosensitive resin. The proportion of the defoamer composition added to the developer will vary with the type of photosensitive resin and ingredients of the developer although 0.05 to 5 parts, more preferably 0.1 to 3 parts by weight of the defoamer composition is preferably added to 100 parts by weight of the developer.

The photosensitive resin plates which are processed with such developers may be made of any desired photosensitive resin composition which can be washed or dissolved out with water or aqueous solution. Exemplary photosensitive resin compositions are compositions comprising a difunctional acryl monomer such as diethylene glycol methacrylate, a photopolymerization initiator such as benzoin, and an alkali soluble polymer such as cellulose acetate succinate (see U.S. Pat. No. 2,760,863), compositions comprising a water soluble polymer such as partially saponified polyvinyl acetate, acryl monomer, and a photopolymerization initiator (see U.S. Pat. No. 3,801,328), compositions comprising a partially saponified ethylene-vinyl acetate copolymer, an acrylate, and a photopolymerization initiator (see Japanese Patent Application Kokai No. 121852/1974), compositions comprising a polyamide having a sulfonate group, a monomer having a urethane bond and a double bond in its molecule such as 1,6-hexamethylenebisacryloylaminomethylcarbamate, and benzophenone (see Japanese Patent Publication No. 129749/1974), compositions comprising a water soluble polymer such as poly(N-vinylpyrrolidone) and a mixture of poly(N-vinylpyrrolidone) and polyvinyl acetate, an acryl monomer, and a photopolymerization initiator (see German Patent No. 24 46 056), compositions comprising an alkali salt of a maleic anhydride adduct of 1,2-polybutadiene, a monomer, and a photopolymerization initiator such as benzoin ethyl ether (see German Patent No. 25 17 034), water soluble, photosensitive polyvinyl alcohol derivatives obtained by sulfoalkylation of partially saponified polyvinyl acetate with cinnamate (see Japanese Patent Publication No. 55282/1973), compositions comprising a polyamide having basic nitrogen in its backbone or side chain, an acryl monomer, and a photopolymerization initiator (see Japanese Patent Publication No. 7605/1975), and the like. Such photosensitive resin plates are commercially available as DYCRIL (trademark by E.I. DuPont), NAPP (tradename by Nihon Paint K.K.), RICH-POLY (tradename by Richardson Graphics Co.), DYNA-FLEX (tradename by Dyna Flex Scope Co.), AQUAMER (trademark by ICI), FRP (tradename by Asahi Chemicals K.K.), etc.

There has been described a defoaming composition comprising (A) an organopolysiloxane containing an oxyalkylene group of formula (1), (B) an organopolysiloxane containing an oxyalkylene group of formula (2), (C) a dimethylpolysiloxane, and (D) a silica filler, which retains antifoaming and mechanical stability when added to solutions for use under severe conditions where high shearing stresses are applied for a long time as encountered in the wash-out step of photosensitive resin after exposure. The defoaming composition is susceptible to agglomeration for a prolonged period of time during such usage, imposing no stain or trouble to the form plates processed therewith or the associated apparatus. The defoaming composition maintains its defoaming action for a long period of time.

EXAMPLE

Examples of the present invention are given below together with comparative examples by way of illustration and not by way of limitation. The viscosity is measured at 25° C.

EXAMPLES 1-6

Defoamer compositions U through Z were prepared by the following procedures. Separately, a photosensitive resin developer was prepared by dissolving 4% by weight of sodium borate $Na_2B_4O_7.10H_2O$ and 2% by weight of an anionic surface active agent, polyoxyethylene alkylphenyl ether sulfate in water. A predetermined amount of each of the defoamer compositions was added to the developer. Each developer having the defoamer added thereto was subjected to a defoaming test, a mechanical stability in dilute form test, and a defoaming and mechanical stability test using a photosensitive resin developing machine. The results are shown in Tables 1 and 2.

EXAMPLE 1

DEFOAMER COMPOSITION U

A defoamer composition U was prepared by blending the following components:

(A-1) 200 grams of an organopolysiloxane containing an oxyalkylene group with a viscosity of 2,830 cs having the following formula:

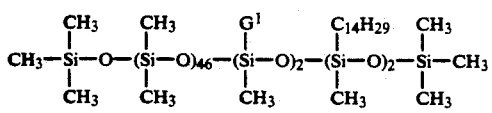

wherein G$^1$:—(CH$_2$)$_3$—O—(C$_2$H$_4$O)$_{25}$—(C$_3$H$_6$O)$_{2.5}$—C$_4$H$_9$, (B-1) 400 grams of an organopolysiloxane containing an oxyalkylene group with a viscosity of 1,640 cs having the following formula:

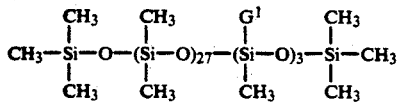

wherein G$^1$ is the same as in (A-1), (C-1) 360 grams of a dimethylpolysiloxane blocked with a trimethylsilyl group at each end having a viscosity of 1,000 cs., and (D-1) 40 grams of silica fine powder (Nipsil VN3, by Nihon Silica K.K.), and thoroughly mixing them in a homomixer.

EXAMPLE 2

DEFOAMER COMPOSITION V

A defoamer composition V was prepared by blending the following components:

(A-2) 150 grams of an organopolysiloxane containing an oxyalkylene group with a viscosity of 1,200 cs having the following formula:

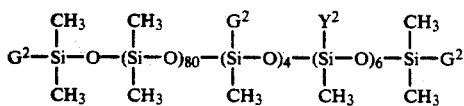

wherein G$^2$:—(CH$_2$)$_3$—O—(C$_2$H$_4$O)$_6$—(C$_3$H$_6$O)$_{24}$—H, and

Y$^2$: —CH$_2$CH$_2$CHCH$_2$C$_6$H$_5$, (B-2) 500 grams of the same organopolysiloxane containing an oxyalkylene group as (B-1), (C-2) 320 grams of a dimethylpolysiloxane blocked with a trimethylsilyl group at each end having a viscosity of 5,000 cs., and (D-2) 30 grams of silica fine powder (Aerogel 300, by Nihon Aerogel K.K.), and thoroughly mixing them in a homomixer.

EXAMPLE 3

DEFOAMER COMPOSITION W

A defoamer composition W was prepared by blending the following components:

(A-3) 100 grams of an organopolysiloxane containing an oxyalkylene group with a viscosity of 3,210 cs having the following formula:

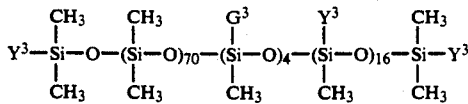

wherein

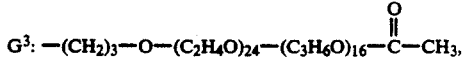

G$^3$: —(CH$_2$)$_3$—O—(C$_2$H$_4$O)$_{24}$—(C$_3$H$_6$O)$_{16}$—C—CH$_3$, and

Y$^3$: —C$_{16}$H$_{33}$, wherein G$^3$: —(CH$_2$)$_3$—O—(C$_2$H$_4$O)$_{24}$—(C$_3$H$_6$O)$_{1.6}$—C—CH$_3$, and Y$^3$: —C$_{16}$H$_{33}$, (B-3) 500 grams of an organopolysiloxane containing an oxyalkylene group with a viscosity of 820 cs having the following formula:

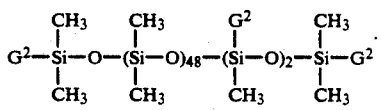

wherein G$^2$ is the same as in (A-2), (C-3) 368 grams of a dimethylpolysiloxane blocked with a dimethylhydroxysilyl group at each end having a viscosity of 1,500 cs., and (D-3) 32 grams of the same silica fine powder as (D-1), and thoroughly mixing them in a homomixer.

Examples 4–6 are outside the scope of the present invention.

EXAMPLE 4

DEFOAMER COMPOSITION X

A defoamer composition X was prepared by blending the following components:

(B-4) 600 grams of the same organopolysiloxane containing an oxyalkylene group as (B-1), (C-4) 360 grams of a dimethylpolysiloxane blocked with a trimethylsilyl group at each end having a viscosity of 1,000 cs., and (D-4) 40 grams of the same silica fine powder as (D-1), and thoroughly mixing them in a homomixer.

EXAMPLE 5

DEFOAMER COMPOSITION Y

A defoamer composition Y was prepared by blending the following components:

(A-5) 250 grams of the same organopolysiloxane containing an oxyalkylene group as (A-2), (B-5) 700 grams of the same organopolysiloxane containing an oxyalkylene group as (B-1), and (D-5) 50 grams of the same silica fine powder as (D-2), and thoroughly mixing them in a homomixer.

EXAMPLE 6

DEFOAMER COMPOSITION Z

A defoamer composition Z was prepared by blending the following components:

(A-6) 600 grams of the same organopolysiloxane containing an oxyalkylene group as (A-3), (C-6) 368 grams of the same dimethylpolysiloxane as (C-3), and (D-6) 32 grams of the same silica fine powder as (D-4), and thoroughly mixing them in a homomixer.

Defoaming Test

To 199.6 grams of the photosensitive resin developer was added 0.4 grams of the defoamer composition. The solution was heated to 40°-50° C., agitated in a juicer mixer at a high speed of about 8,000 r.p.m. for 2 minutes, and immediately poured into a measuring cylinder of 1000 ml volume. The foaming amount, which is the sum of liquid volume plus foam volume, was measured to determine its change with time.

Mechanical stability test

To evaluate the mechanical stability of the defoamer in dilute form, 8 grams of the defoamer composition was added to 392 grams of the photosensitive resin developer. The solution was heated to 40°-50° C. and agitated in a juicer mixer at a high speed of about 8,000 r.p.m. for 10 minutes. The floating scum was collected on cotton fabric by filtration and dried at 70° C. for 3 hours before the weight of the dry scum was measured.

Defoaming and mechanical stability test using a processor

Layers of APR resin (tradename by Asahi Chemicals K.K.) were exposed to a UV lamp in an exposure apparatus, obtaining relieves. The relieves were developed in a A-3 size manual processor with a developer solution prepared by adding the defoamer composition to the photosensitive resin developer. The solution had a temperature of 40° C. and a volume of 50 liters. The processor was operated a number of cycles each involving a developing time of 60 seconds when the solution was sprayed to each relief through an injection nozzle by means of a pump and a quiescent time of 30 seconds.

The defoaming ability was evaluated in terms of the developing cycles and the injection pressure. A lower drop of the injection pressure indicates better defoaming. The mechanical stability was evaluated by collecting the floating scum on the developer surface at the end of 10 developing cycles and measuring the weight of the scum.

TABLE 1

| Defoaming Composition | Composition (g) | | | | Foaming amount (ml) after | | | | | Scum weight (g) |
|---|---|---|---|---|---|---|---|---|---|---|
| | A | B | C | D | 30 sec. | 1 min. | 2 min. | 3 min. | 5 min. | |
| U | 300 | 400 | 360 | 40 | 290 | 280 | 260 | 240 | 220 | 0.6 |
| V | 150 | 500 | 320 | 30 | 300 | 280 | 260 | 235 | 215 | 0.7 |
| W | 100 | 500 | 368 | 32 | 310 | 290 | 275 | 250 | 235 | 0.4 |
| X* | — | 600 | 360 | 40 | 490 | 450 | 390 | 350 | 280 | 1.5 |
| Y* | 250 | 700 | — | 50 | 920 | 790 | 700 | 670 | 630 | 0.2 |
| Z* | 600 | — | 368 | 32 | 390 | 370 | 320 | 290 | 250 | 1.9 |
| Control | — | — | — | — | >1000 | >1000 | >1000 | 980 | 940 | 0.1 |

*outside the scope of the invention

TABLE 2

| Defoaming composition | Pump injection pressure (kg/cm²) | | | | | | Scum weight (g) |
|---|---|---|---|---|---|---|---|
| | 1st | 2nd | 4th | 6th | 8th | 10th | |
| U | 0.85 | 0.83 | 0.83 | 0.81 | 0.80 | 0.80 | 6 |
| V | 0.85 | 0.82 | 0.82 | 0.82 | 0.81 | 0.81 | 5 |
| W | 0.85 | 0.83 | 0.82 | 0.82 | 0.80 | 0.80 | 7 |
| X* | 0.85 | 0.82 | 0.80 | 0.79 | 0.78 | 0.78 | 17 |
| Y* | 0.85 | 0.78 | 0.74 | 0.72 | 0.72 | 0.71 | 2 |
| Z* | 0.85 | 0.80 | 0.76 | 0.74 | 0.74 | 0.74 | 18 |

*outside the scope of the invention

As is evident from Tables 1 and 2, defoamer compositions X and Z lacking component (A) or (B) showed poor mechanical stability despite relatively good defoaming ability. Defoamer composition Y lacking component (C) was less defoaming although it was mechanically stable. In contradistinction, defoamer compositions having all components (A) to (D) combined according to the invention were fully effective in defoaming power and were mechanically stable.

Although some preferred embodiments have been described, many modifications and variations may be made thereto in the light of the above teachings. It is therefore to be understood that within the scope of the appended claims, the invention may be practiced otherwise than as specifically described.

We claim:
1. A defoamer composition comprising
(A) 5 to 50 parts by weight of an organopolysiloxane containing an oxyalkylene group having formula (1):

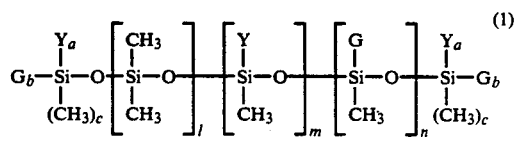

wherein Y is a monovalent hydrocarbon group having 6 to 30 carbon atoms or an alkoxy group having 6 to 30 carbon atoms,
G is an oxyalkylene group of the formula:

wherein R is a divalent hydrocarbon group having 2 to 6 carbon atoms, A is a group selected from the class consisting of a hydrogen atom, an acetyl group, an alkyl group having 1 to 8 carbon atoms, and an isocyanate group, $d = 6$ to 60, $e = 2$ to 60, $d + e = 8$ to 75, and $e/(d+e) = 0.2$ to 0.8, said oxyalkylene group having an average molecular weight of 500 to 5,000,
a and b are independently equal to 0, 1 or 2,
c is equal to 1, 2 or 3,
$a + b + c = 3$,
l is an integer of from 10 to 200,
m is a number such that $m + 2a$ is equal to 1 to 50,
n is a number such that $n + 2b$ is equal to 1 to 30, and
$(n + 2b)/l = 0.01$ to 1,
(B) 100 parts by weight of an organopolysiloxane containing an oxyalkylene group having formula (2):

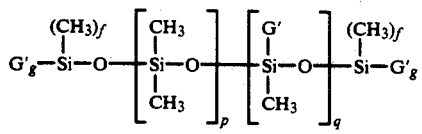
(2)

wherein G' is an oxyalkylene group of the formula:

wherein R and A are as defined above, h=6 to 60, i=2 to 60, h+i=8 to 75, and i/(h+i)=0.2 to 0.8, said oxyalkylene group having an average molecular weight of 500 to 5,000, f is equal to 1, 2 or 3,
g is equal to 0, 1 or 2,
f+g=3,
p and q are independently integers of at least 1, and (q+2g)/p=0.02 to 1, (C) 20 to 200 parts by weight of a dimethylpolysiloxane having a viscosity of 100 to 1,000,000 centistokes at 25° C. and (D) a silica filler.

2. The composition of claim 1, which comprises 0.1 to 30 parts by weight of silica filler (D).

3. The composition of claim 1, wherein formula (1): Y has 8 to 20 carbon atoms; d=10 to 30, e=4 to 30, d+e=15 to 60; m+2a is equal to 2 to 30, n is a number such that n+2b is equal to 2 to 20 n and (n+2b)/l=0.05 to 0.4.

4. The composition of claim 1, wherein in formula (2): h is 10 to 30, i is=4 to 30 and h+i=15 to 60.

5. The composition of claim 1, which contains 1-20 parts of a silica filler having a specific surface area of 50 to 500 m²/g as measured by BET.

6. The composition of claim 3, wherein in formula (2): h=10 to 30, i=4 to 30 and h+i=15 to 60; and wherein the silica filler has a specific surface area of 50 to 500 m²/g as measured by BET.

7. The composition of claim 1, wherein component (A) is a compound of one of the formulae

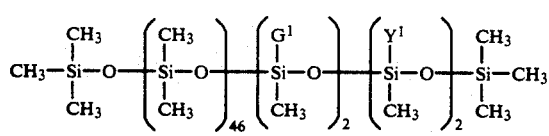

wherein G¹: —(CH₂)₃—O—(C₂H₄O)₂₅(C₃H₆O)₂.₅—C₄H₉ and Y¹: —C₁₄H₂₉;

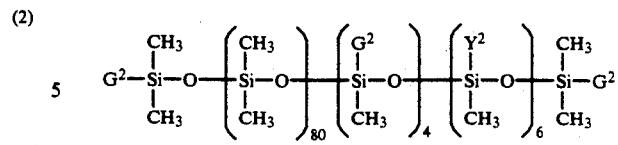

wherein G²:—(CH₂)₃—O—(C₂H₄O)₆—(C₃H₆O)₂₄—H and Y²:

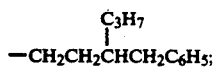

and;

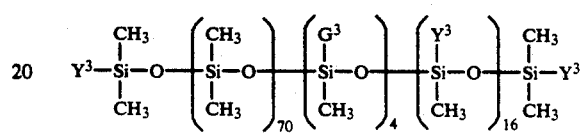

wherein G³:

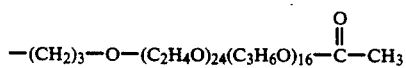

and Y³: —OC₁₆H₃₃.

8. The composition of claim 1, wherein component (B) is a compound of one of the formulae

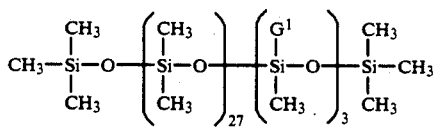

wherein G¹: —(CH₂)₃—O—(C₂H₄O)₂₅—(C₂H₄O)₂.₅—C₄H₉ and

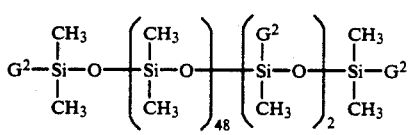

wherein G²: —(CH₂)₃—O—(C₂H₄O)₆—(C₃H₆O)₂.₄—H.

* * * * *